United States Patent
Darin et al.

[15] 3,683,016
[45] Aug. 8, 1972

[54] STAGED CATALYST ADDITION FOR CATALYTIC LIQUID PHASE OXIDATION OF PSEUDOCUMENE TO TRIMELLITIC ACID

[72] Inventors: John K. Darin, Munster, Ind.; Dileep R. Kanitkar, Chicago, Ill.

[73] Assignee: Standard Oil Company, Chicago, Ill.

[22] Filed: April 24, 1970

[21] Appl. No.: 31,786

[52] U.S. Cl. .............................................260/524 R
[51] Int. Cl. ...............................................C07c 63/02
[58] Field of Search ...................................260/524 R

[56] References Cited

UNITED STATES PATENTS 3,491,144   1/1970   Ember et al. ...............260/524
3,532,746   10/1970  Ember .........................260/524

*Primary Examiner*—Lewis Gotts
*Assistant Examiner*—R. S. Weissberg
*Attorney*—Arthur G. Gilkes, William T. McClain and Fred R. Ahlers

[57] ABSTRACT

Reduced tendency for oxidation inhibition leading to formyl phthalic acids and methyl phthalic acids during liquid phase oxidation of 1,2,4-trimethylbenzene with molecular oxygen in the presence of acetic acid and catalysis provided by a source of bromine and staged use of two or more heavy metals is further reduced by staging addition of cobalt, manganese and cerium by maintaining a weight ratio of bromine to total metals above 1.0 in all stages and conducting the oxidation at a temperature in the range of 360°–440° F. with the last stage above 400° F. At the same time reduced oxidation of acetic acid to oxides of carbon and water and reduced requirements for total metal and bromine sources are achieved without sacrifice of reaction time or yield and quality of trimellitic acid.

3 Claims, No Drawings

STAGED CATALYST ADDITION FOR CATALYTIC LIQUID PHASE OXIDATION OF PSEUDOCUMENE TO TRIMELLITIC ACID

BACKGROUND OF THE INVENTION

The oxidation method of U.S. Pat. No. 2,833,816 is disclosed as successfully oxidizing 1,2,4-trimethylbenzene to trimellitic acid but in a rather low yield of 92 weight (52.5 mole) percent. Early development of that method improved trimellitic acid yields to the range of 70–80 mole percent which are low by comparison to 90–99 mole percent terephthalic acid yields from p-xylene by improvements of said method. Trimellitic acid yields remained at an apparent ceiling of 70–80 mole percent because of some auto inhibition effect even when there were applied the same improvements which lead to 90–99 mole percent yields of terephthalic acid.

Said auto inhibiition and metal depletion of the oxidation site were found to be diminished by staged addition sequence of oxidation metal components when two or more of such components of different oxidation potential were used in their otherwise coacting or complimenting combinations. That improvement is disclosed for example in Canadian Pat. No. 803,562. The staging of metal oxidation catalyst components, according to that patent, is accomplished by first using with a bromine compound metals having a high oxidation potential, i.e., cobalt, cerium or mixtures thereof and later, when about most of the trimethylbenzene has been oxidized beyond dimethyl benzoic acids (that is 45 to 55 percent of the methyl groups have been oxidized to carboxylic acid groups), a metal of lower oxidation potential, e.g., manganese or a metal having an oxidation potential not greater than manganese, is added to the oxidation reaction and the oxidation is completed in the presence of the source of bromine and all the added catalyst metal components. Such staging of catalyst metal components permitted the use of relatively high input of molecular oxygen oxidant (e.g., air) and resulted in suitably high oxygen concentrations in and utilization by the liquid phase oxidation reaction as evidenced by lower coformation of methyl phthalic acids and formylphthalic acids and higher (80–90 mole percent) yields of trimellitic acid.

Such high yields of trimellitic acid product, 80–90 mole percent of diminished organic impurity content but substantial metal content were achieved by said staged sequential use of oxidation metal components of different oxidation potential provided staged temperature and air input schedule were also practiced. Such staged temperature and air input schedule was effected by starting the oxidation at a lower temperature in the range of 290°–380° F. and increasing the oxidation temperature throughout the reaction cycle until reaction was concluded at 400°–450° F. For example, the reaction temperature was increased 10°–15° F. in substantially equal time periods of 10–15 minute durations as air input was increased for most, generally for all but the last, of those temperature increases, to maintain an oxygen rich condition in the liquid phase oxidation site (evidenced by about 1.0–5.0% $O_2$ by volume on combustible free basic in exhaust gas). Then, during the last period of temperature increase this desired temperature was maintained by controlling air input so that incoming air did not quench the liquid phase oxidation and/or by the addition of external heat.

Drawbacks of said staging of addition of oxidation metal components were control maintenance of the scheduled catalyst addition, temperature increases and air input, excessive acetic acid oxidation and sensitivity of the oxidation to inhibition. Such scheduling was conducted successfully for commercial operations to produce higher yields of higher quality trimellitic acid product but there was also the attendant problems of corrosion of metals available for use in fabricating oxidation vessels and product contamination by metals both from catalyst and corrosion of metals used in reaction vessel fabrication. The latter caused loss of product by disposal of residues having substantial trimellitic acid content, for example, by incineration of the metal trimellitates. The corrosion problem and metal contamination appears to have been associated with the choice of concentrations of catalyst components based on 1,2,4-tri-methyl-benzene and choice of weight ratio of bromine to total oxidation metal components essential to that catalyst metal component staging process. In general the total metals concentration of choice based on 1,2,4-tri-methylbenzene for the first stage catalysis exceeded 0.3 percent and the bromine concentration on 1,2,4-trimethylbenzene was well above 2.0 percent even up to 5 percent. Also the bromine to metal ratio (weight basis) either was below 1.0 or exceeded 2.5. The low bromine to metal ratio, while suppressing corrosion, did not effect a suitable change in metal contamination of product and the high bromine to oxidation metal ratio accentuated corrosion and metal contamination of product; also introduced bromine-containing impurities in the desired trimellitic acid product which lead to additional discard of the desired product. The staging of metal components, moreover, induced excessive acetic acid oxidation. Said staging was sensitive to inhibition, resulting in frequent poor oxidations. For example, oxidation reactors out of service for a short time could not be put back into useful oxidation service at a low bromine to metal ration, but rather successful oxidation had to be started up with high bromine to metal concentration and with high catalyst component concentrations.

It is desirable to oxidize 1,2,4-trimethylbenzene as completely as possible to trimellitic acid not only to obtain high yields of that acid product in the oxidation effluent but also to provide potential of recovery of crude trimellitic acid product with low partial oxidation impurities but also without extensive oxidation of acetic acid. Low impurity formation is a goal also desirable because trimellitic acid is rather soluble in acetic acid and the methylphthalic acids and formylphthalic acids impurities appear to enhance the solubility of trimellitic acid leading to contamination of the product precipitated from the oxidation effluent, especially a concentrate thereof. Thus said partial oxidation products in the oxidation effluent have a limiting effect on trimellitic acid precipitation by crystallization from said effluent making necessary additional processing steps to effect recovery of the remaining trimellitic acid solute in the mother liquor after separation from first crop product. Also the presence of said impurities require special processing of the total crude trimellitic acid to obtain it in a commercially acceptable quality as its intramolecular anhydride.

An improved mode of conduct for staged addition of oxidation metal components for the catalytic liquid phase air oxidation of 1,2,4-trimethylbenzene to trimellitic acid has been discovered. This improved mode of conduct provides a shorter overall reaction cycle, reduces metals corrosion and contamination of desired crude product while retaining high yields of the desired acid and low production of methylphthalic acids and formylphthalic acids impurities features of the prior oxidation metals staging and reduces acetic acid oxidation. This improved staging of oxidation metals permits the use of lower metals and acetic acid to 1,2,4-trimethylbenzene ratios, and provides a crude trimellitic acid product of lower metals and bromine-containing impurities which can be more conveniently removed from crude trimellitic acid. Other advantages from this improved mode of conduct for oxidation metals staging will be apparent from the disclosure which follows.

SUMMARY OF THE INVENTION

The present invention staged addition of metal oxidation catalyst components for the catalytic liquid phase air oxidation of 1,2,4-trimethylbenzene (also known as pseudocumene and hereinafter referred to as "PSC") to trimellitic acid (hereinafter referred to as "TMLA") is conducted using acetic acid reaction medium in the weight ratio to PSC of 3.0 to 4.0:1.0. The metal oxidation catalyst components are cobalt, cerium and manganese. Total metal concentration based on PSC is in the range of 0.2 to 0.4, preferably 0.28 to 0.32, weight percent in combination with a source of bromine providing a bromine to total metal ratio of 1.5 to 5.0, preferably 1.6 to 4.5, on a weight basis. The manganese component of the catalyst is in the range of 10 to 25 weight percent based on the total weight of catalyst metals. The cerium content of the total metals used is in the range of 5 to 25, preferably 5 to 15, percent by weight of total metals.

The disadvantages of staged catalyst addition are overcome by using manganese in amount, 10 to 25 percent, of manganese initially and then adding the remaining 75 to 90 percent of the manganese later to retain the prior benefits of delayed manganese addition. Cerium is added in substantially equal proportions in each stage to overcome the aforementioned sensitivity drawback and to permit the use of reduced bromine concentration in all stages. All of the cobalt is added to the first stage.

Also to achieve the benefits of this invention it is important to conduct the last oxidation stage at a temperature upward from 400° F., desirably 400° to 440° F. and preferably 400° to 435° F. The preceding stages can be conducted at temperatures from 350° up to 400° F. For a two-stage process the first stage temperature can be in the range of 360° to 390° F. For a three-stage process first stage temperatures of 360° to 380° F. and a second-stage temperature of 380° to 400° F. and third-stage temperature of 400°–430° F. are desirable. Residence time in each stage is substantially equal. For example, in the three stage oxidation of PSC for a total of one hour, the residence time is about 20 minutes in each stage assuming equal residence volume reaCtion vessels for each stage.

The acetic acid to PSC weight ratio of 3.0 to 4.0:1.0 used in the present invention staged catalyst PSC oxidation is about 60 percent of the 5.0 to 6.0 weight ratio used in the previous stage catalyst addition technique to achieve best TMLA yield and quality. For an oxidation of given effective operating volume, the 60 percent lower acetic acid to PSC ratio means that a larger amount of PSC can be oxidized in a single set of staged oxidation vessels by the process of this invention than was possible in the prior staged oxidation using 5 to 6 weight parts acetic acid per part PSC. For the process of this invention the initial water content of the acetic acid can be 3–5 percent. Restriction of water content of the acetic acid portion of the effluents from each stage can be controlled readily by known means, for example, by addition of acetic anhydride or by azeotropic distillation of acetic acid water condensate from exhaust gas using benzene as an azeotropic agent for example.

The oxidation of PSC can be conducted batchwise, semicontinuously or continuously. For batchwise oxidation, all the PSC and most (85–90 percent) of the acetic acid and initial amount of catalyst components are charged at or near oxidation initiation temperature, preferably at 350°–360° F., and at a pressure to maintain liquid phase conditions. Then pressurized air is injected into the reaction mixture and the reaction temperature is permitted to increase by heat evolved by the oxidation reaction to 370°–380° F. Air input to all stages should provide an exhaust from each stage of at least 1 to 3 percent oxygen by volume on condensibles free basis. Reaction temperature is increased for each stage just prior to addition of additional catalyst components dissolved in acetic acid having 3 to 5 percent water content. The oxygen content of exhaust gas from each later stage can be higher than 4 percent by volume on condensibles free basis, for example up to 14 to 16 percent in the last stage on the average with 17 to 20 percent oxygen by volume on condensibles free basis at termination of the oxidation.

For a semi-continuous process the acetic acid (85–90 percent of total to be used) and first increment of catalyst components are charged to the oxidation vessel and heated to reaction temperature of first stage. Then PSC is introduced continuously with simultaneous addition of air. After all the PSC has been added the next increment of catalyst components dissolved in acetic acid is added after the next stage temperature is reached. Each successive stage then is conducted in the same oxidation vessel as in the batchwise operation. For continuous operation the first stage is conducted as for semi-continuous oxidation but each staged addition of catalyst components is added to an oxidation vessel connected in series with the preceeding vessel by way of effluent transfer conduit including a heat exchanger so that the effluent from the preceeding stage can be heated to the temperature of the next stage and be mixed with the added catalyst at the time of entering said next stage. TMLA is recovered from the effluent from the last stage.

The total bromine can be from a single source of bromine, for example, ionic bromine sources (HBr, NaBr, NH$_4$Br and the like) or from combined form of bromine, for example, organic bromides such as benzyl bromide, tetrabromoethane and others. It is preferred that the bromine source be supplied by a combination of ionic bromine compound and combined form of bromine and most preferably 15 to 25 percent from ionic bromine form and 85 to 75 percent from combined form of bromine preferably tetrabromoethane. However, up to 100 percent ionic bromine can be used successfully. Such preferred mixtures of sources for bromine component of the catalyst assist in the reduction of acetic acid oxidation.

The understanding and practice of the process of this invention will be assisted by the following illustrative examples.

EXAMPLE 1

Batchwise conduct of the present invention staged catalyst addition practice is carried out with commercial PSC containing 97 percent 1,2,4-trimethylbenzene. Initially charged to the oxidation reactor is 120 parts of that commercial PSC and an acetic acid solution (384 parts of acetic acid) containing dissolved salts of cobalt, manganese and cerium which provide total metals content of 0.22 weight percent based on PSC, the weight ratio of cerium to total metals of 0.1, weight ratio of manganese to total metals of 0.1 and dissolved bromides of 0.8 weight percent bromine based on PSC. This charge is at a temperature of 365° F. and a pressure to maintain acetic acid in the liquid phase. At the thirtieth minute of the reaction cycle there are added 40 parts of acetic acid containing dissolved manganese and cerium to provide respectively 0.12 and 0.03 weight percent thereof based on original PSC and bromide compounds to provide 0.9 additional weight parts bromine based on original commercial PSC charged. The total metals are now 0.37 weight percent based on original PSC. The operation of this batchwise oxidation is set out below showing four portions of the reaction cycle.

| Oxidation Cycle | | Operating Conditions | | | |
|---|---|---|---|---|---|
| Portion | Time-Minutes Start End | Average Pressure p.s.i.g. | Average Temp.°F. | Air Input SCFH/ lbPSC | Net Mole $O_2$ Reacted |
| 1 | 0   10 | 130 | 368 | 93.0 | 0.99 |
| 2 | 10   30 | 165 | 378 | 102.0 | 2.79 |
| 3 | 30   50 | 263 | 398 | 91.5 | 4.11 |
| 4 | 50   65 | 398 | 403 | 44.8 | 4.21 |

The total yield of trimellitic acid from the foregoing oxidation amounts to about 90.7 mole percent based on the 1,2,4-trimethylbenzene content of commercial PSC. Associated with trimellitic acid are 0.17 weight percent methyl phthalic acids and 0.04 weight percent formyl phthalic acids. The total of CO and $CO_2$ produced is 0.56 moles per mole PSC. About one-half of the 0.56 moles comes from acetic acid burning during oxidation.

COMPARATIVE OXIDATION 1

For comparison, batchwise oxidations conducted under conditions similar to Example 1 but having only cobalt and cerium initially present in a total of 0.22 percent and bromine at 1.6 percent for first 30 minutes then cobalt, cerium and manganese present in a total of 0.37 percent and bromine at 2.5 for remainder of the reaction (total of 64 minutes) all based on weight of PSC charged, give a product having 0.27–0.51 percent methyl phthalic acids and 0.15 to 0.25 formyl phthalic acids and a total of CO + $CO_2$ of about 0.62 to 0.81 moles per mole PSC.

The difference between total 0.62–0.81 CO + $CO_2$ of the above batchwise prior staged metal additions and 0.56 mole of Example 1 is 0.06–0.25 mole is indicative of the increased burning of about 0.06 to 0.25 mole more of acetic acid per mole PSC charged or 3 to 12.5 more pounds of acetic acid burned per 100 pounds PSC charged.

The bromine content of trimellitic acid obtained from oxidations conducted according to the present invention process (e.g. Example 1) is in the range of 150–200 ppm whereas the bromine content of trimellitic acid from the comparative oxidation is in the range of 600–800 ppm.

The foregoing reduction in methyl phthalic acid content of trimellitic acid and acetic acid burning demonstrate the improvement afforded by the process of this invention.

EXAMPLE 2

The above noted improvements can be achieved by using the conditions of Example 1 except initially charging about one-third of the initial solution of acetic acid and catalyst, heating this solution to 365° F. and thereafter charging a mixture of the 120 parts of PSC and the remaining two-thirds of acetic acid solution of catalyst over a period of 30 minutes with air input at 98–102 SCFH per pound PSC, then adding 40 parts of acetic acid containing additional manganese, cerium and source of bromine while adjusting temperature, pressure and air input as described in Example 1. By such a semi-continuous oxidation the yield of PSC can be improved to 92–93 mole percent, the methyl phthalic acid and aldehydebenzene dicarboxylic acid content of the recovered product can be kept at about 0.04 percent of each of said impurities and acetic acid burning can be maintained as low as in Example 1.

EXAMPLE 3

This example illustrates the use of the present invention staged oxidation of PSC on a continuous basis. For this oxidation three oxidation zones are employed with equal residence time in each zone for a total residence time of about 60 minutes. The conditions in each zone are as follows:

| | First Zone | Second Zone | Third Bore |
|---|---|---|---|
| Temperature °F. | 370 | 400 | 430 |
| Exhaust gas – $O_2$ % Vol. | 2–3 | 2–3 | 12–14 |
| Pressure – P.S.I.G. | | | |
| Weight ratio solvent/PSC | 3.5 | 3.5 | 3.5 |
| Content of effluent – Wt. %* | 5.0 | 5.0 | 8.5 |
| Air input SCFM/lbPSC | 95 | 110–120 | 25–35 |
| Catalyst composition: | | | |
| Total metals/PSC | 0.1025 | 0.205 | 0.305 |
| Ce/total metals – % | 11 | 12.2 | 12.3 |
| Bromine/PSC – % | 0.175 | 0.35 | 0.525 |
| Br/total metals | 1.7 | 1.7 | 1.7 |

*The water content of the effluent from each oxidation zone is expressed as weight percent water based on acetic acid solvent.

Pseudocumene is charged at 120 pounds per hour with 420 pounds per hour of 95 percent acetic acid (95 percent acid-5 percent water) solution of catalyst. The first and second reaction zones exhaust their gaseous mixture (gases and vapors) to condensation-distillation (azeotropic wherein acetic acid and water are condensed out and the condensate is azeotropically distilled to obtain acetic acid for recycle to the respective oxidation zones to maintain the solvent as 95 percent acetic acid in the first two zones. This recycle acetic acid is used to dissolve additional catalyst components to increase the total catalyst in the manner shown. The liquid effluent from the first zone is charged to the second zone. The liquid effluent from the second zone is charged to the third zone. The gaseous exhaust from the third zone is passed through a condenser to recover aqueous acetic acid for recycle to the third zone with additional catalyst components.

By such a continuous oxidation the trimellitic acid yield is in the range of 94–96 mole percent and each of the methylphthalic acid and formylphthalic acid content remain at about 0.04 weight percent. Also acetic acid burning is no greater than in Example 1.

COMPARATIVE OXIDATION 2

Commercial PSC (120 parts) as used in Example 1 and acetic acid (370 parts) solution of cobalt and cerium salts to provide total metal concentration of 0.415 percent of PSC and bromides to provide 1.05 weight percent bromine on PSC comprise the initial charge to the oxidation reactor. The charge is initially at 290° F. and 159 p.s.i.g. pressure. Upon heat up by retention of heat of reaction the reaction upon input of air at 85 SCFM per pound of PSC the temperature reaches 370° F. at end of first 15 minutes and in the next 15 minutes increase of pressure to 200 p.s.i.g., temperature to 385° F. and air input to 95 SCFM is practiced. Thereafter 90 parts acetic acid containing dissolved manganese to provide 0.055 weight percent on PSC is added. In the next 15 minutes (45 total minutes) increase in pressure to 290 p.s.i.g. and temperature to 395° F. but air input is decreased to 87 SCFM per pound PSC to hold that temperature. The last 15 minutes (60 total minutes) temperature is increased to 455° F., pressure increased to 400 p.s.i.g. and air input is decreased further to 25 SCFH per pound PSC. This 60 minute reaction cycle while producing a 92 mole percent trimellitic acid yield based on 1,2,4-trimethylbenzene in commercial PSC also had associated with the total solids in the reaction effluent 0.65 weight percent methylphthalic acids and 0.13 weight percent formylphthalic acids.

What is claimed is:

1. An improved method of oxidizing pseudocumene to trimellitic acid which comprises catalytic oxidizing pseudocumene with air in the presence of acetic acid in an oxidation zone wherein liquid phase conditions are maintained and wherein the weight ratio of acetic acid to pseudocumene is in the range of 3.0–4.0:1.0 and the catalyst consists of one or more heavy metal oxidation catalysts and a source of bromine, the improvement consisting of the staged addition of a combination of sources of cobalt, manganese, cerium and bromine components to provide 0.2 to 0.4 weight percent total metals based on pseudocumene in at least two stages wherein each stage there is present a weight ratio of bromide ion to total metals ions of 1.5–5.0:1.0 and a cerium content of 5–25 percent and manganese of 10–25 percent each by weight of the total metals, all the cobalt is added to the first stage with about 10–25 percent of the manganese, the portion of total cerium added to each stage is calculated as that fraction of the total cerium equal to about the reciprocal of the number of stages, the remaining 75–90 percent of manganese is added to the last stage, the temperature in the last stage is upward from 400° F. and the temperature in the preceding stage is between 350° and 400° F.

2. The method of claim 1 wherein the oxidation is conducted in two stages, the cerium component of the catalyst for the first stage is 0.5–0.55 of total cerium used, the temperature in the first stage is 360°–390° F., the remainder of the cerium and manganese catalyst components are added to the second stage to provide a total weight percent metal to pseudocumene weight ratio of 0.2 to 0.4 and the second stage temperature is 400°–435° F.

3. The method of claim 1 conducted in three oxidation zones wherein pseudocumene and acetic acid solution of about 0.3–0.35 of the cerium catalyst components is charged to the first zone operated at a temperature of 360°–380° F., 0.3–0.35 of additional cerium catalyst component together with the effluent from the first zone are added to the second zone operated at 380°–400° F. and the effluent from the second zone with the remaining cerium and manganese catalyst components are added to the third zone operated at a temperature of 400°–430° F. to provide therein based on the pseudocumene charged a total metal content of 0.2 to 0.4 weight percent of which 5 to 15 weight percent is cerium.

* * * * *